United States Patent [19]

Schweigert et al.

[11] 4,415,095

[45] Nov. 15, 1983

[54] LID AND SEAL FOR JAR

[76] Inventors: Lothar L. Schweigert, 3609 Cody Rd., Sherman Oaks, Calif. 91403; Stephen R. Paik, 821 Third Ave., Los Angeles, Calif. 90005

[21] Appl. No.: 340,603

[22] Filed: Jan. 19, 1982

[51] Int. Cl.³ .............................................. B65D 53/00
[52] U.S. Cl. .................................. 215/329; 215/344; 215/DIG. 1
[58] Field of Search ................ 215/344, DIG. 1, 343, 215/329, 345

[56] References Cited

U.S. PATENT DOCUMENTS 3,242,522  3/1966  Jass et al. ........................ 215/329 X
3,747,792  7/1973  Anthony .............................. 215/344
3,857,509  12/1974  Baldwin et al. ..................... 215/329

FOREIGN PATENT DOCUMENTS 788148  12/1957  United Kingdom ................ 215/344

Primary Examiner—Donald F. Norton
Attorney, Agent, or Firm—Whann & McManigal

[57] ABSTRACT

A container with lid having a reusable sealing gasket integrally formed therein in which the gasket extends downwardly and outwardly from the lid into contact with the container rim. The gasket is geometrically shaped in the form of the frustrum of a right circular cone. In the present invention, turning of the lid a sufficient amount engages a lid-to-jar stop which mechanically stops further rotation at the point where the gasket has been grossly deformed a predetermined amount sufficient to obtain a high degree of seal. The gasket operates by having its lower edge wipe along and radially expand along the top surface of the container, the lower edge being placed under tension as the radial expansion occurs.

2 Claims, 4 Drawing Figures

LID AND SEAL FOR JAR

BACKGROUND OF THE INVENTION

The present invention relates to container or jar lids or caps which incorporate a sealing gasket which is engageable with the rim which surrounds the access opening of the container for providing an airtight reusable seal for the container. As used herein "jar" or "container" refers to any vessel having an opening adapted to be sealingly engaged by a lid and includes bottle, vessel, and all other such descriptive terms. As used herein, the word "lid" will refer to any reusable and removable means of closing the access opening and includes the terms cap, cover, closure and the like.

Many substances and preparations sold in the market deteriorate in contact with air and therefore must be supplied in airtight containers. Such products are often sold in containers which screw caps or lids. Present practice is to place a thin sealing disk, i.e., gasket, within the cover so that when the cover is screwed into place the sealing disk or gasket is clamped between the upper surface or rim of the jar and the lid to form an airtight seal which protects the contained substance or preparation from deterioration by oxidation.

Such seals are often made as a separate element which is inserted into the lid and retained by some means such as cement or a mechanical contrivance formed in the lid. These seals incur a manufacturing cost for their production as a separate element and a further cost for the cement used to keep them in place and for the labor to assemble them into the lid. When considering the immense quantity of jars which are filled with preparations and sold to the public, the cost of the sealing gaskets heretofore used involves considerable aggregate expense. When any of these seals approaches failure, the shelf life of the product is reduced and the replacement cost of products which have become damaged through oxidation is considerable.

In practice, with screw lids, or over center strap design lids, the gaskets are compressed flat between the inside surface of the lid portion and the jar top or rim, the latter usually having an annular flat surface juxtaposed to the lid. Such flat engagement of the gasket relies for sealing on the development of a direct compressive force against the gasket. Since the gasket is usually rather thin, it has limited elasticity and compressibility since it cannot deform by more than a small fraction of its thickness. Therefore, the sealing force developed is accordingly limited.

In many such jar lid constructions, if cement is used, the gasket will often fall out of the lid upon use, to the annoyance of the user. Attempts have been made to integrate the sealing gasket into the lid, including the use of a soft plastic annular ring inside the lid which is often fused into permanent adherence to the lid. This technique involves considerable additional manufacturing expense and by its configuration is limited to sealing forces achievable by flat compression between the jar rim and the lid. Gross deformation of the sealing member is not usually utilized.

In another prior art proposed design the gasket is shown to depend from the circumferential limit within the lid. The jar gasket has a sidewall which is disposed to contact the annular end surface of the jar rim at the opening of the jar. This form is found to be unsatisfactory and not form an airtight seal.

OBJECTS AND SUMMARY OF THE INVENTION

An object of the invention is to provide a jar, lid and seal or gasket, the latter being integrally constructed of plastic formed as a unitary molded part of the lid and so designed as to eliminate the additional cost incurred for the separate manufacture of a gasket part and to avoid the labor, assembly and cement cost expenses previously incurred.

Another object of the invention is to provide a jar, lid and seal or gasket combination of the above character which is particularly effective in providing a reliable long shelf life seal which will effectively prevent oxidation of the contents for an extended period prior to initial opening.

Another object of the invention is to provide a sealing element for a jar lid which comprises a flange type gasket member cast or molded integrally into the lid as a unitary structure which has a minimum flexibility yet is relatively stiff so as to provide a substantial pressural contact or sealing force between an annular edge of the sealing gasket and the surface of the jar which it engages.

It is a further object of the invention to provide a sealing member which forms a part of the lid and has a lower container surface contacting an annular edge which as the lid is screwed into place the gasket edge slides outwardly and spirally along the container surface, the pressure of contact increasing as the lid is screwed in place. In specimens constructed by the inventors this pressure can be as high as 80 pounds.

It is a still further object of the invention to provide a sealing gasket which is annular and is connected to the lid, at least the lower portion of the gasket being in the form of a frusto cone having a parallel inner and outer side surface and a lower annular container engaging edge, and which combination includes means for limiting the outward movement of the lower end of the gasket member so that the inner sidewall thereof cannot engage the engaging surface of the rim of the container.

It is an object of the invention to provide a sealing gasket which has sufficient rigidity so that the gasket cannot bend or distort in such a way that the inner sidewall of the gasket could come into contact with any portion of the container, irrespective of the amount of force applied against the annular edge of the sealing gasket.

The present invention is particularly designed so that the gasket will develop tension in the outer circumferential portion. The engaging edge of the gasket wipes outwardly and spirally along an end surface of the jar rim as the lid is turned. The seal is well effected at a preselected amount of rotation of the lid.

In the present invention the gasket and lid are integrally molded as a one-piece plastic part, the gasket being in the shape of a downwardly depending frustrum of a cone opening and enlarging away from the lid and terminating in a ring or annular sealing edge. This lower annular edge engages and wipes along the upper rim of the jar as the lid is moved into fully closed position. The lid, gasket and jar are so constructed and arranged that when the desired degree of sealing deformation and pressure has been reached a mechanical stop on the jar is engaged. When the stop is reached, the gasket has been sufficiently deformed and the preselected sealing force has been achieved.

In the gasket on the present invention the larger lower end forms an annular ring which expands as the gasket is increased in diameter, creating a circumferential tension in the gasket. The lower edge wipes radially along the rim of the jar to enhance the seal which is formed.

These and other objects and features of the invention will be brought out in the following detailed description of this specification, wherein detailed description is for the purpose of fully disclosing the invention without placing limitations thereon.

Referring to the accompanying drawings, which are for illustrative purposes only:

This view discloses the position of the parts just before or at the time the sealing gasket of the lid engages the upper surface of the jar.

Figure 2:
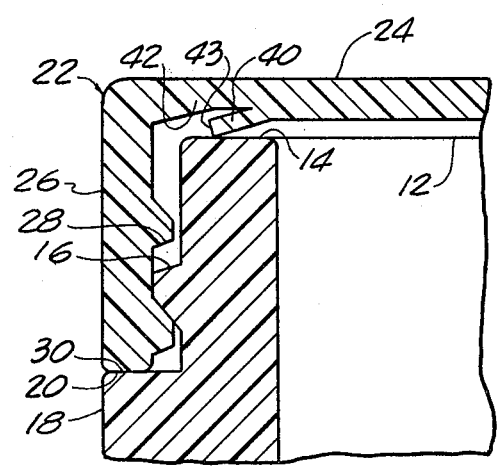

FIG. 2 is a fragmentary sectional view showing the position of the parts when the cap or lid of the jar or container has been fully screwed into place.

Figure 3:
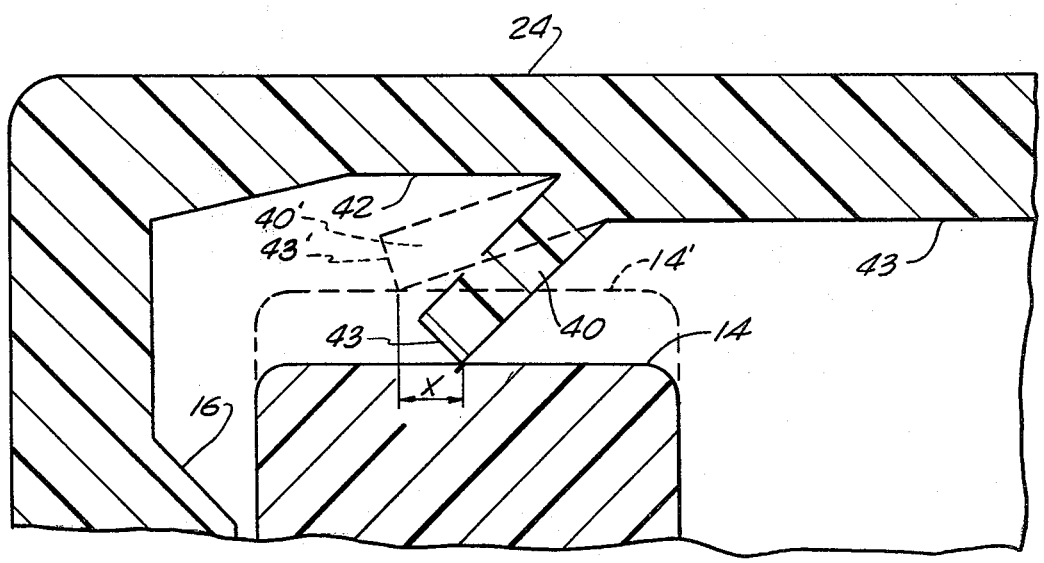

FIG. 3 is a composite view which in full lines shows the sealing gasket in a position in which the upper surfaces of the jar is being engaged; and the dotted lines show the position of the sealing gasket and upper surface of the jar when the parts are fully screwed into place.

Figure 4:
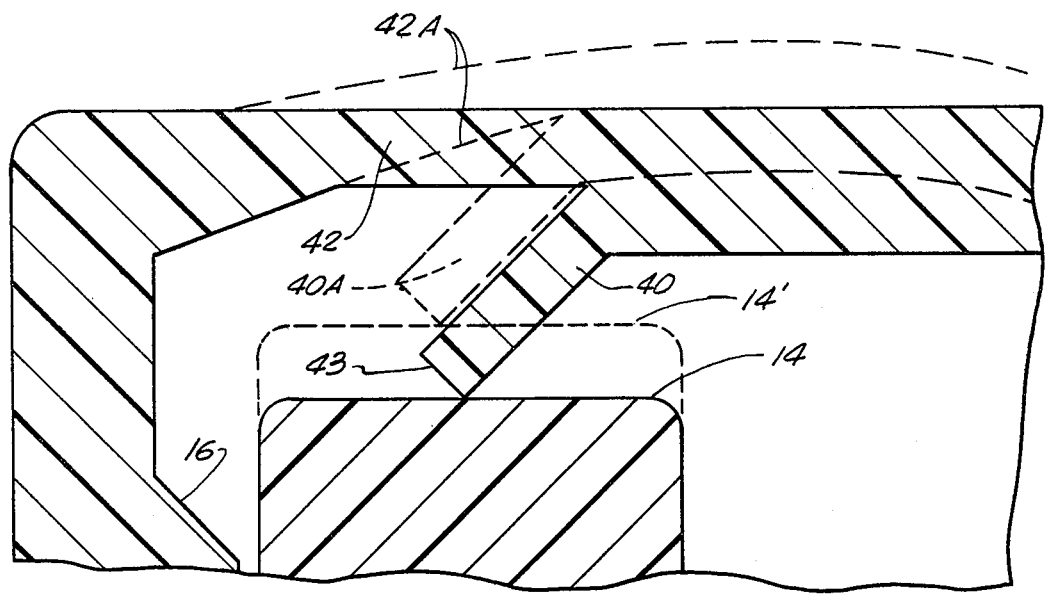

FIG. 4 is a fragmentary sectional view of our invention in which movement of the sealing gasket is provided for the flexibility of the top wall of the lid.

DESCRIPTION OF A PREFERRED EMBODIMENT

Figure 1:
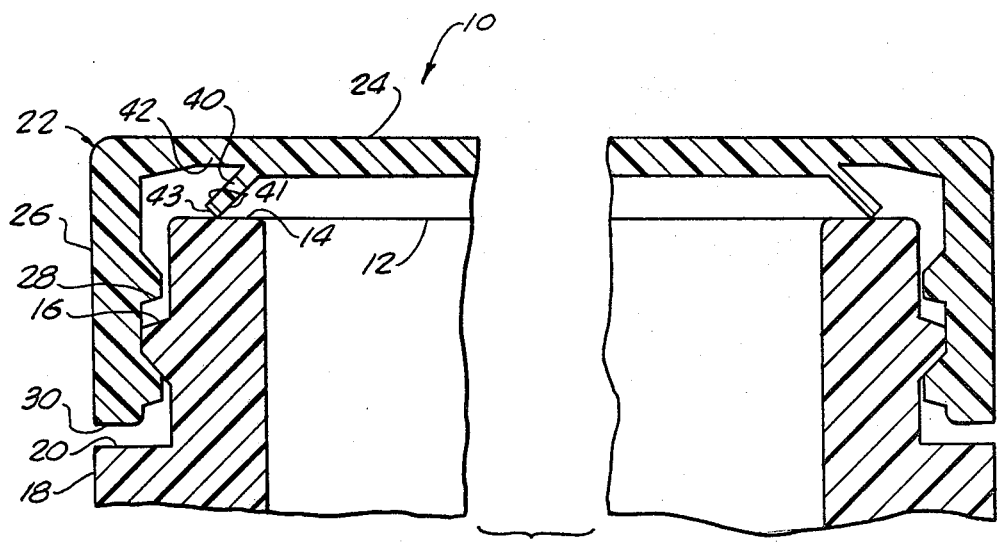
FIG. 1 is a cross sectional view of a jar or container embodying the features of our invention. The view is a vertical sectional view on the diameter of the jar and lid assembly; however, the central portion of the view has been removed.

Referring to FIG. 1, the jar, gasket and lid construction of the present invention is shown in detail and comprises generally a jar 10 having an upper portion defining an opening 12 which terminates in an upwardly facing rim 14. The jar is provided with a circumferential screw thread 16 which is recessed slightly from the outer wall 18 of the jar to define a mechanical stop 20. The jar may be made of any suitable jar material such as glass, plastic, metal, or the like.

The lid 22 includes a cover portion 24 which extends laterally to cover the opening 12 of the jar and terminates in a circumferential skirt 26 which extends downwardly and is provided with inwardly formed screw threads 28 which match those of the jar. The lower end of the skirt terminates in a circumferential plane defining a lid stop portion 30 adapted to abut the jar stop 20 when the lid has been assembled to the jar a predetermined distance.

The lid incorporates and has formed therein as part of its unitary construction a gasket or sealing member 40 which depends downwardly and outwardly from the cover element 24, as shown. Both the gasket and the lid are preferably made of a suitable plastic material being flexible or nonrigid when formed in an appropriately small cross section. The gasket has inner and outer surfaces 41, and an end wall 43 extends from the region at 42 where it joins the cover 24 downwardly and outwardly at approximately a 45° angle from vertical and is in the shape of the frustrum of a right circular cone. The joinder between the gasket and the cover at 42 lies on the circle formed in a plane defined by the lower surface of the cover which plane intersects at right angles the axis of symmetry of the jar opening. The lower circumferential end 43 of the gasket is larger than the upper edge and also lies on a circle at right angles to a plane intersecting the axis of symmetry of the jar opening and lid. In this way, as the lid is screwed onto the jar and the gasket makes contact at its lower circumferential corner of edge 43 with the flat rim 14 of the jar such contact will be uniform throughout the entire circle of engagement and will occur at the same instant in order to provide the uniform wiping and sealing action to the described.

FIG. 2 illustrates a gross deformation which occurs to the gasket element as the lid is being screwed into its final closing position. As shown the rim of the jar and the gasket edge move together closing the gasket to be deformed outwardly. The gasket member, as the parts move together, expand and as it does the annular edge 43 slides outwardly along the surface 14. Because of the rigidty of the gasket member it resists bending action and almost all of the bending occurs where the gasket 40 joins to the horizontal part of the lid.

As shown in FIG. 2, the lower end 30 of the skirt of the lid contacts the jar stop 20 at a predetermined distance and achieves the application of a preset amount of sealing force and gasket deformation.

Referring to FIG. 3, the full lines show the position of the parts as the edge or corner 43 is about to or just engages the surface 14. It will be noted that at this time the sealing gasket 40 is extending outwardly from the lid at an angle of approximately 45°. At this time the corner or annular edge 43 is brought into pressurable contact with the horizontal surface 14 of the jar. As the cap or lid is rotated in the proper direction the threads 16 move the cap downward to bring the surfaces 20 and 30 into contact with each other. When the surfaces 20 and 30 contact each other, the surface 14 is brought into a position 14' and the sealing gasket 40 is brought into the dotted line position 40'. As this relative movement between the lid and jar is taking place there is an annular and radial spiral movement of the engagement edge 44 against the surface 14. The corner 44 moves outwardly a distance equal to that indicated at "X⇌". During this outward sliding movement of the corner or edge 44, the pressure of this edge increases and by the time the edge reaches the dotted line position it has swept the surface 14 and the pressure contact between 44 and 14 has increased so that a fluidtight, airtight seal is formed.

By way of example, the following materials have been found useful and suitable for carrying out this invention: the jar 10 may be made of glass, plastic or metal manufactured in the usual manner; the lid 22 may be made of any suitable plastic which is not subject to chemical attack by the contents of the jar. One such suitable plastic is polypropylene of a formula which gives a maximum of rigidity.

In a size of jar and lid which has been constructed by the inventors, dimensions were found to be satisfactory and to develop the necessary sealing force between the lid gasket and jar. The gap between the surfaces 20 and 30 at the time the edge or corner 44 engages the surface 14 is approximately 0.015 of an inch. The gasket and the lid were made of polypropylene, the gasket portion having a thickness of approximately 0.045 of an inch. The screw arrangement of jar and lid provide for the jar to be sealed one-eighth of a turn further than the initial engagement of the lower edge of the gasket with the rim top. By provision of the mechanical stop between the skirt of the lid and the jar, the actual state when a full seal has been established is mechanically indicated by refusal of the lid to turn further.

It should be particularly noted that the inner and outer edges of the jar rim 14 are not engaged by the gasket to effect the sealing force as is common in much of the prior art. Rather, the edge of the gasket pressurally contacts the upper face of the jar rim and wipes across the same.

FIG. 4 shows an alternative form of our invention in which all or substantially all of the movement of the gasket is provided by making the parts substantially identical to those shown in FIGS. 1 to 3, except the top horizontal wall 42 is made thin to give it flexibility so that when the lid is screwed into place on the container, the cover, as shown by dotted lines 42a, will be deformed as shown with the result that the movement of the gasket from 41 to dotted line position 41a can occur with a minimum or substantially no bending action of the gasket 40, the movement of the gasket 40 being substantially a stretching or expanding action which occurs because the plastic in moving from full line position to dotted line position expands or stretches and is not required to bend under the force transferred from the rim surface 14 to the annular edge or end 44 of the gasket.

We claim:
1. In a container and lid arrangement including and integral sealing gasket, the combination of:
   a. a container having an access opening surrounded by a rim having an end engagement surface,
   b. a closure for said container adapted to be screwed on and from said container and having a cover wall, and
   c. a gasket comprising an annular wall at least partly of frusto conical shape mounted on said cover wall, having its smaller end adjacent said cover wall and its lower larger end having an annular lower edge adapted to engage said engageable surface of said container rim, said larger end of said gasket expanding outwardly along said engageable surface and in contact therewith, said gasket having sufficient stiffness to resist bending so that the inner surface of said gasket will not contact said engageable surface of said container rim.
2. A combination as defined in claim 1 in which said gasket is of substantially rectangular cross section.

* * * * *